United States Patent [19]
Thompson et al.

[11] 3,732,354
[45] May 8, 1973

[54] CABLE END SEAL, SUPPORT AND GROUNDING ASSEMBLY

[76] Inventors: John T. Thompson, 244 Loring Street, Los Angeles, Calif. 90024; George W. Gillemot, 2331 20th Street, Santa Monica, Calif. 90405

[22] Filed: Jan. 19, 1971

[21] Appl. No.: 107,794

[52] U.S. Cl. ........................ 174/78, 174/38, 174/60, 339/95 R, 339/176 R, 29/628
[51] Int. Cl. ............................................. H02g 15/02
[58] Field of Search ..................... 339/14, 95, 176, 339/177, 59–61; 174/38, 60, 75, 76, 78, 41, 51

[56] References Cited

UNITED STATES PATENTS

| | | | |
|---|---|---|---|
| 3,499,972 | 3/1970 | Smith | 174/88 |
| 2,083,606 | 6/1937 | Johansson | 339/266 R |
| 3,593,002 | 6/1969 | Hebert | 219/541 |
| 3,594,691 | 7/1971 | Neal | 339/29 |
| 3,253,247 | 5/1966 | Vos | 174/78 |

*Primary Examiner*—Marvin A. Champion
*Assistant Examiner*—Robert A. Hafer
*Attorney*—Sellers and Brace

[57] ABSTRACT

Means for hermetically sealing, suspending and grounding a shielded multi-conductor cable relative to a pedestal-type terminal board facility. The components utilized for these purposes include a first solderless terminal assembly embracing and clamping the cable shield and sheath together, a pair of compressable solderless terminals telescoped over the opposite ends of a combination cable suspension and grounding conductor strap anchorable at one end to the clamping bolt of the first solderless terminal assembly and the other end to the terminal board facility. A slit sleeve loosely embraces the cable end and is charged with potting compound thereby hermetically sealing together the cable end, the sleeve and the adjacent components of the suspension unit and precluding the entry of moisture into the cable.

14 Claims, 5 Drawing Figures

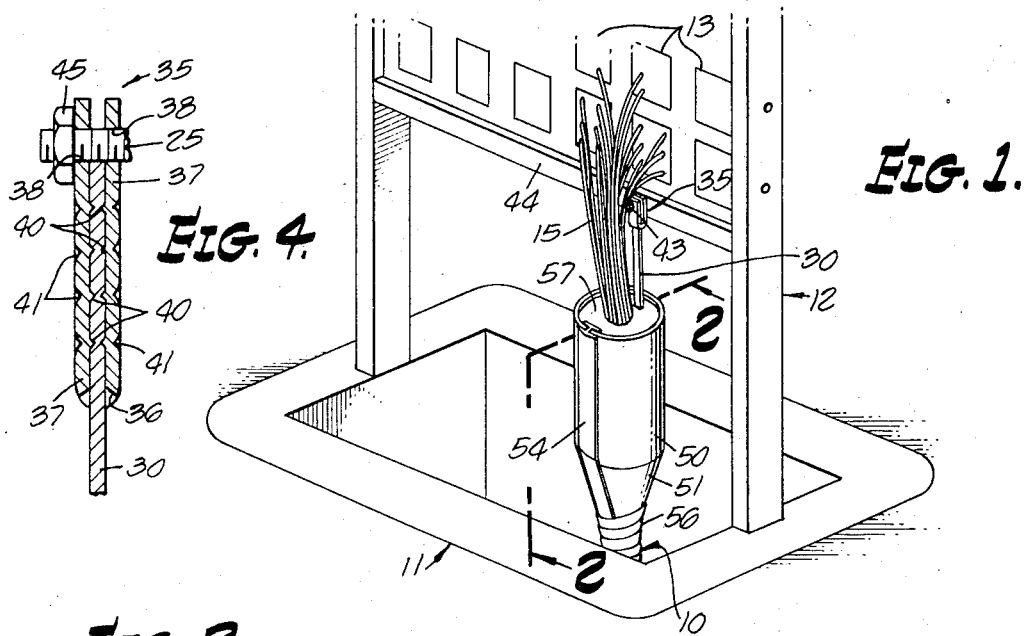
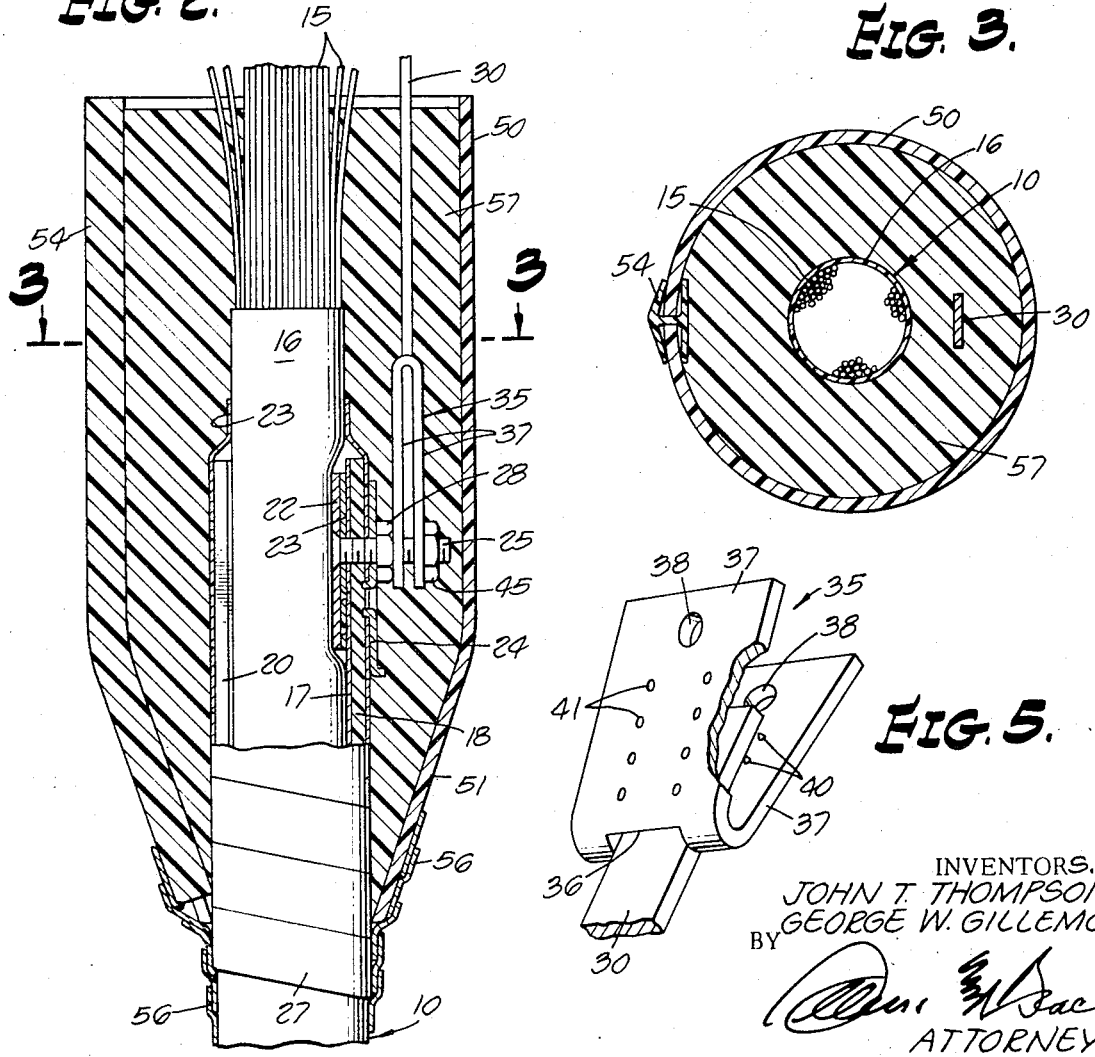
INVENTORS.
JOHN T. THOMPSON
GEORGE W. GILLEMOT
BY
ATTORNEYS

CABLE END SEAL, SUPPORT AND GROUNDING ASSEMBLY

This invention relates to grounding and sealing facilities for shielded multi-conductor cables and more particularly to highly versatile components adapted to be assembled between a terminal board support or pedestal and the cable end, and providing a high strength electrical and mechanical connection between the pedestal and the cable.

Various expedients have been resorted to heretofore to terminate underground cables at terminal board facilities with provision for connecting the cable conductors to electrical equipment or to other cables. Not only must the cable end be sealed closed to safeguard against the entry of moisture, but means must be provided for anchoring the cable end to a suitable support to avoid stressing the individual conductors. Additionally, it is important that the cable shield be provided with an adequately strong and reliable ground connection.

The present invention provides simple, rugged, easily operated components meeting the foregoing and other needs in a highly satisfactory manner. These components include a set of three solderless terminal assemblies, a high strength combination grounding conductor and cable suspension strap, and an enclosure sleeve for the cable end fillable with sealing compound after all the parts have been properly adjusted and checked for accurate assembly. One solderless terminal assembly utilizes the strength of the cable sheath to greatly augment the strength of the shield itself in providing a high strength electrical and mechanical connection to the cable shield. Additionally, one of a pair of simple, one-piece solderless connectors telescoped over the opposite ends of an imperforate ductile suspension strap serves, when tightened, to provide a high strength mechanical and electrical connection between the cable shield solderless terminal and the lower end of the grounding strap and the other serves to anchor the upper end of the strap in like manner to the terminal board pedestal. The sleeve used to encapsulate the cable end is slit and formed of flexible material so that it is readily assembled about the cable after all other parts of the assembly have been completed following which the sleeve is charged with potting compound selected to form a strong hermetic bond with all surfaces in contact therewith.

Accordingly, it is a primary object of the invention to provide a new and improved mode of sealing a cable end and including provision for grounding the cable shield and for rigidly anchoring the cable end to a suitable fixed support.

Another object of the invention is the provision of simple, rugged components including a plurality of solderless terminal assemblies cooperating to provide a strong mechanical and electrical connection between the cable shield and a grounded terminal board pedestal.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view showing one preferred embodiment of the invention fully assembled to a typical cable terminal board pedestal;

FIG. 2 is a fragmentary cross sectional view on an enlarged scale taken along line 2—2 on FIG. 1;

FIG. 3 is a cross sectional view taken along line 3—3 on FIG. 2;

FIG. 4 is a longitudinal sectional view of the solderless terminal in assembled position taken through one row of the bonding projections; and FIG. 5 is a perspective view of the bonding bar being inserted between the legs of the terminal clip.

Referring initially more particularly to FIG. 1, there is shown a conventional multiple conductor cable 10 having one end projecting upwardly through an access box 11 having its lower end in communication with an underground cable duct system. Box 11 normally terminates somewhat above the surrounding ground level and provides an anchorage and support for a metal framework 12 of a pedestal-type terminal board facility equipped in known manner with electrical accessories or with terminal board strip 15 to which the cable conductors are secured. This facility is normally enclosed by an inverted hood, not shown, having its lower end suitably secured to the rim of access box 11. The details of such pedestals and their many uses are well known to those skilled in this art and need not be described in greater detail.

The means provided by this invention for supporting the cable end in an upright position adjacent the equipment or terminal board to which it is to be attached will be best understood by reference to FIGS. 2 and 3. Such cables customarily comprise a multiplicity of conductors 15 surrounded by an inner tubular sheath of insulation 16 embraced by a thin-walled metallic electrical shield 17 underlying the outer tough, thick, elastomeric cable sheath 18.

In preparing each cable end for connection to the terminal boards 13 a suitable length of the sheath, shield and inner liner is removed to expose and free the ends of individual conductors 15. Shield 17 and sheath 18 are usually cut back by the same amount and so as to leave an inch or two length of layer 16 exposed.

The next step in the operation is to provide a strong electrical and mechanical connection to the thin, fragile electrical shield layer 17. This is preferably accomplished according to this invention by first slitting cable sheath 18 for a distance of several inches from one end, as is indicated at 20 in FIG. 2. This permits the slit portions of shield 17 and sheath 18 to be expanded away from the conductors while making a hole through each to receive the threaded shank of a solderless connector. This connector comprises an inner shoe 22, a flexible spring shim 23, and outer metallic shoe 24 and a threaded shank or bolt 25 secured to inner shoe 22 and extending loosely through aligned openings in shim 23, shield 17, sheath 18 and outer shoe 24. Shim 23 has a greater curvature than shoe 22 and is formed with a multiplicity of low-height sharp-edged burrs effective facing outwardly to penetrate a film of insulation often present on the inner surface of shield 17. This solderless terminal assembly is of the same general construction disclosed in and claimed in our copending application for U.S. Letters Patent, Ser. No. 765,158, filed Oct. 4, 1968.

This assembly is installed while the shield and sheath are expanded away from the conductors, as is permitted by slit 20, thereby facilitating the insertion of threaded shank 25 from the inner ends of the aligned assembly holes. Prior to placing the outer shoe 24 over the shank it is desirable to secure the sheath snugly about the conductors and to hold the same snugly thereagainst by one or more servings of friction tape 27 for a distance extending beyond the opposite ends of slit 20. This having been accomplished an inner clamping nut 28 is assembled to shank 25 after placing the outer shoe 24 in assembled position. Nut 28 is then thoroughly tightened causing the sharp burrs on shim 23 to scratch and penetrate through any insulating film present on shield 17 and so as to form a multiplicity of electrical contacts with the shield. The high pressure applied to layer 17,18 sandwiched between the inner and outer shoes compresses the parts into high pressure contact with one another. Additionally the wide surfaces of the inner and outer shoes are forced into high pressure frictional contact with the respective layers thereby distributing any load forces applied to the solderless assembly to a large area portion of both shield 17 and the tough cable sheath 18.

The assembler may now proceed to complete the assembly by attaching similar solderless connectors to the opposite ends of a heavy gauge strip of ductile metal 30. This strap is cut to the proper length to suspend the end of cable 10 at the proper height relative to the terminal board of pedestal 12 to which it is to be connected. Desirably, strap 30 is free of perforations and is of uniform width and thickness from end to end in order that its full strength and capacity may be utilized for both its mechanical and electrical functions. Although its opposite ends may be provided with holes fitting over the threaded shank 25 of the above described solderless cable terminal and to a bolt holding the strap anchored to the frame of pedestal 12, it is preferred that the strap be free of weakening openings of any kind and instead that the type of solderless terminals 35 shown in FIGS. 2 and 4 be utilized.

Solderless terminals 35 comprise a heavy gauge U-shaped clip formed of high strength spring stock. The bight portion of each is provided with a wide opening 36 having a close sliding fit with strap 30. In their relaxed condition, the clip legs 37,37 flare outwardly and their free ends are provided with a pair of aligned openings 38 to receive a clamping bolt 25. An important feature is the provision on the inner surfaces of legs 37 of a multiplicity of sharp crested projections formed by making sharp-bottomed depressions 41 from the outer or exterior sides of each of the legs. Projections 40 are preferably arranged in rows with their sharp edges facing one another from the inner faces of the clip legs.

Terminals 35 are anchored immovably to the ends of strap 30 by inserting the ends through openings 36 of the clips and then assembling openings 38 either over threaded shank 25 or a bolt 43 passing through a hole in one of the metallic structural members 44 of pedestal 12. Before tightening either of the bolts care should be exercised to note that the end of the strap is close to or in contact with the bolt. Thereafter, nuts 45 of the bolts are tightened against the outer legs of the solderless terminal. Owing to the tempered nature of the material comprising clip 35, the sharp crested projections 40 readily penetrate the ductile material of strap 30 as the legs are forced into high pressure contact with its opposite faces. In this manner there is provided a powerful interlocking mechanical and electrical grip between the strap and each leg of the clip. The completed assembly utilizes the full strength of the strap and the components associated therewith both for mechanical strength and electrical current carrying capacity.

The foregoing operations having been completed, the operator encapsulates the end portion of the cable utilizing the tapering split sleeve 50. This sleeve has a cylindrical body and a conical lower end 51 and is split fron end to end in order that the semi-flexible elastomeric material of which it is composed can be expanded sufficiently in girth for assembly about the suspended cable to enclose the portion opposite the lower end of suspension strap 30. Normally, the installer cuts away a portion of the pointed end 51 of the sleeve as necessary to form a snug fit with the particular size cable being encapsulated. The split in the sleeve is preferably closed by a semi-flexible sealing strip 54 of H-shape in cross section as best appears in FIG. 3. The free edges of this strip have resilient gripping action with the sidewalls of the sleeve as the strip is telescoped astride the split from the upper end of the sleeve.

Before charging the sleeve with potting compound it is desirable to serve its lower end with several convolutions of friction tape 56 to avoid escape of potting compound. This having been done the top of the sleeve is charged with a fluent potting compound 57 of any well known composition. Preferably a thermosetting resinous compound is desirable because of its pronounced sealing characteristics for a wide variety of different materials. As soon as the potting compound takes a set all parts of the assembly enclosed by sleeve 50 become hermetically sealed against the entry of moisture and all parts are prevented from loosening. No moisture can enter the cable since the compound readily penetrates between the exposed surfaces of conductors 15 and fills all voids between these conductors.

While the particular cable end seal, support and grounding assembly herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. That improvement in terminating and hermetically sealing the end of a multi-conductor cable at a terminal facility which comprises removing a length of the cable sheath to expose the ends of the cable conductors, slitting the sheath sufficiently to insert an inner clamping shoe and a bolt extending outwardly through a hole therefor in the sheath which hole has a continuous perimeter and through a hole in an outer clamping shoe anchoring a grounding conductor strap of rectangular cross-section to the outer end of said bolt by the aid of a nut assembled to the bolt effective as it is tightened to clamp the cable sheath tightly between said inner and outer shoes and said grounding conductor strap, and embedding and sealing the portion of the cable end in the vicinity of said clamping bolt in potting compound with the individual conductors and the free end of said grounding conductor strap projecting outwardly beyond said sealing compound.

2. That improvement defined in claim 1 characterized in providing said grounding conductor strap with solderless terminal means at the outer free end thereof and securing the same rigidly and in good electrical contact to grounded conductive means.

3. That improvement defined in claim 2 characterized in utilizing grounding conductor strap which is free of openings from end to end thereof.

4. That improvement defined in claim 3 characterized in utilizing solderless terminal means comprising a U-shaped terminal clip having a wide opening in the bight portion thereof sized to receive the end of said conductor strap, said terminal clip having a plurality of heat-hardened sharp-crested projections formed on the inner surface thereof effective to bite into said conductor strap assembled through said bight opening as the legs of said clip are compressed against the juxtaposed surfaces of said conductor strap, the free ends of the clip legs having aligned openings through which said clamping bolt extends, and applying nut means to the outer end of said bolt for compressing said clip legs together to anchor said conductor strap immovably assembled between the legs of said clip.

5. That improvement defined in claim 4 characterized in that said sharp-crested projections on said clip are arranged in rows extending lengthwise of said clip legs.

6. That improvement defined in claim 4 characterized in that said sharp-crested projections project toward one another from the inner face of each leg of said clip.

7. That improvement defined in claim 3 characterized in the provision of solderless terminal means assembled over the opposite ends of said conductor strap and comprising a U-shaped heat-hardened clip having inwardly projecting sharp-crested projections effective to bite into said conductor strap after an end thereof has been inserted through an opening in the bight portion of said U-shaped clip and as the clip legs are compressed against the opposed faces of the respective ends of said conductor strap, one of said clips having aligned openings in its leg ends mountable over the end of a clamping bolt and the other of said clips having aligned openings in its leg ends to receive a bolt clampable to a grounded conductive support pedestal for the cable end.

8. That improvement defined in claim 1 characterized in the provision of a tubular sleeve surrounding and enclosing said potting compound.

9. That improvement defined in claim 8 characterized in that said sleeve is formed of semi-rigid material and split lengthwise thereof to permit expansion of its sidewalls sufficiently for assembly of the sleeve about the cable from the side thereof, and semi-rigid strip means having oppositely facing grooves therealong sized to have a snug fit over a respective adjacent edge of said split in said sleeve, said potting compound being bondable to the interior surfaces of said sleeve and to said strip means as the same takes a set.

10. That improvement defined in claim 9 characterized in that one end of said tubular sleeve is frusto-conical with the smaller end thereof sized to closely embrace a cable sheath, and gasket means at the smaller end of said sleeve cooperating with the cable sheath to hold the potting compound captive while setting.

11. That improvement defined in claim 7 characterized in that said cable end projects upwardly and terminates at a level spaced below an anchor point on said support pedestal, and said conductor strap projecting upwardly from said cable end being securely clamped to said anchor point and serving as a combined grounding conductor for the cable shield and a high strength suspension support between said pedestal and said cable end.

12. That improvement in electrically and mechanically anchoring a multi-conductor shielded cable encased in a tough sheath to a terminal board pedestal which comprises: a first solderless terminal assembly having inner and outer wide area metallic shoes held clamped respectively against the inner surface of said shield and the outer surface of said sheath by a clamping bolt, a pair of U-shaped one-piece solderless terminal clips formed from wide strip stock of uniform rectangular cross section and having an opening in their bight portions telescoped over the opposite ends of a heavy gauge ductile grounding strap of rectangular shape in cross section with the free ends of the clip legs projecting beyond a respective end of said strap, the inner surfaces of said clip legs having hardened sharp-crested projections biting into the juxtaposed strap surfaces as the clip legs are compressed toward one another and against the juxtaposed surfaces of said strap thereby to anchor said clips immovably to the strap ends, the lower one of said clips being clamped to the outer end of the clamping bolt of said first solderless terminal assembly by the tightening of the latter, and the upper one of said clips being rigidly clamped to said terminal board pedestal, and sleeve means embracing the cable end and the lower end of said strap and charged with potting compound hermetically sealing together the components in contact therewith.

13. That improvement defined in claim 12 characterized in that said strap is imperforate and arranged vertically between said terminal board pedestal and said first solderless terminal assembly.

14. That improvement defined in claim 12 characterized in that said ductile strap is cut to size at the time of assembly to a given cable end and so that said strap is loaded in tension upon the anchorage of its upper end to said pedestal.

* * * * *